United States Patent
Kan et al.

(10) Patent No.: US 9,002,811 B2
(45) Date of Patent: Apr. 7, 2015

(54) SYSTEM, METHOD AND PROGRAM FOR INFORMATION PROCESSING

(75) Inventors: Masaki Kan, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 13/128,738

(22) PCT Filed: Nov. 13, 2009

(86) PCT No.: PCT/JP2009/069313
§ 371 (c)(1),
(2), (4) Date: May 11, 2011

(87) PCT Pub. No.: WO2010/055901
PCT Pub. Date: May 20, 2010

(65) Prior Publication Data
US 2011/0218999 A1    Sep. 8, 2011

(30) Foreign Application Priority Data

Nov. 14, 2008 (JP) ................................. 2008-292582

(51) Int. Cl.
*G06F 17/00* (2006.01)
*G06F 7/00* (2006.01)
(Continued)

(52) U.S. Cl.
CPC ...... *G06F 17/30306* (2013.01); *G06F 21/6227* (2013.01)

(58) Field of Classification Search
CPC ............................................... G06F 2221/2141
USPC .................................................. 707/783, 696
See application file for complete search history.

(56) References Cited

U.S. PATENT DOCUMENTS 5,347,653 A * 9/1994 Flynn et al. ................... 707/695
5,440,730 A * 8/1995 Elmasri et al. ......... 707/999.203
(Continued)

FOREIGN PATENT DOCUMENTS

JP    2001344245 A    12/2001
JP    2007-511831 A    5/2007
(Continued)

OTHER PUBLICATIONS

International Search Report for PCT/JP2009/069313 mailed Dec. 8, 2009.
(Continued)

*Primary Examiner* — Pavan Mamillapalli
(74) *Attorney, Agent, or Firm* — Sughrue Mion, PLLC

(57) ABSTRACT

An index update unit analyses the information stored in a document repository to create an index for search and stores the index in a time-series divisional index storage unit and creates, from an ACL repository, an access control entry ACE in association with the index for search, which is correlation of information to be searched with access right of at least a group to which the user belongs. The ACL cache generation unit creates ACL cache data that correlates the user with access right to the information to be searched, from the ACE, and registers the ACL cache data created in an ACL cache. A search processing unit searches for an index for search in response to a request for search from said user. In case the ACL cache data correlating the user with the index for search is registered in the ACL cache, the search processing unit takes, from among the information searched, the information, reference to which is allowed for the user as a search result, based on information in the ACL cache.

36 Claims, 12 Drawing Sheets

(51) Int. Cl.
*G06F 17/30* (2006.01)
*G06F 21/62* (2013.01)

(56) References Cited

U.S. PATENT DOCUMENTS

| | | | | |
|---|---|---|---|---|
| 5,915,112 | A * | 6/1999 | Boutcher | 719/330 |
| 6,243,718 | B1 * | 6/2001 | Klein et al. | 707/999.003 |
| 7,305,629 | B2 * | 12/2007 | Barsness et al. | 715/788 |
| 7,451,149 | B2 | 11/2008 | Lee et al. | |
| 7,490,079 | B2 * | 2/2009 | Shipp et al. | 707/999.002 |
| 7,860,867 | B2 | 12/2010 | Kan et al. | |
| 2001/0027451 | A1 * | 10/2001 | Taguchi et al. | 707/3 |
| 2003/0101200 | A1 * | 5/2003 | Koyama et al. | 707/200 |
| 2007/0016583 | A1 * | 1/2007 | Lempel et al. | 707/9 |
| 2007/0027732 | A1 * | 2/2007 | Hudgens | 705/7 |
| 2007/0226174 | A1 * | 9/2007 | Saito | 707/1 |

FOREIGN PATENT DOCUMENTS

| | | |
|---|---|---|
| JP | 2007-199950 A | 8/2007 |
| JP | 2008-243089 A | 10/2008 |
| WO | 2008044542 A | 4/2008 |

OTHER PUBLICATIONS

C. D. Manning et al., "An Introduction to Information Retrieval", Cambridge University Press, 2008, pp.61-77, [Internet] Retrieved on Nov. 2008, <URL>http://www-csli.stanford.edu/~hinrich/Information-Retrieval-book.html.

"Repository Resource no Security", Oracle XML DB Kaihatsusha Gide, [online] http://otndnld.oracle.co.jp/document/products/oracle10g/102/doc_cd/appdev.102/B19255-01/xdb21sec.htm. Oracle, Dec. 25, 2007, [retrieved on Nov. 27, 2009].

Realcom, Realcom Quarterly Vision—Enterprise 2.0 wa Honmonoka? ~Web2.0 tono Honahitsuteki Chigal ro Aratana Hoga~, http://www.realcom.co.jp/trend/vision/vol12/extender3.html, 2007, [retrieved on Nov. 30, 2009].

Japanese Office Action for JP Application No. 2010-537811 mailed on Sep. 17, 2013 with English Translation.

* cited by examiner

FIG. 6

| Key;user | Record: READ ENABLE FLAG |
|---|---|
| userid+index id | 101010111111000011111110 |
| userid+index id | 100010110101101001011100 |

SYSTEM, METHOD AND PROGRAM FOR INFORMATION PROCESSING

REFERENCE TO RELATED APPLICATION

This application is the National Phase of PCT/JP2009/069313, filed Nov. 13, 2009, which is based upon and claims the benefit of the priority of Japanese patent application No. 2008-292582 filed on Nov. 14, 2008, the disclosure of which is incorporated herein in its entirety by reference thereto.

TECHNICAL FIELD

This invention relates to a system, a method and a program for information processing and, in particular, to a system, a method and a program that may be applied to advantage to information search.

BACKGROUND

In an enterprise oriented search engine, such as ESP (Enterprise Search Platform), search that takes user's access right into account is necessary in view of ensuring security. The ESP transversely searches for information on the Internet and that on intra-enterprise information processing systems, and is also termed 'intra-enterprise integrated search platform'. Control of access right to a file (document) or folder (directory) is performed using ACL (Access Control List).

A function required of ACL search is to present, as a result of search, only those documents to which a user has access rights. The following describes the ACL search.

Patent Document 1, for example, discloses an information search apparatus which takes access right that is set in a document into account to perform search. Specifically, the information processing apparatus includes an index storage means which correlates the information acquired by a file information acquisition means with the information acquired by a right information acquisition means to store the resulting correlated information as an index. The right information acquisition means acquires right information indicating a user that is allowed to access a file. The information processing apparatus also includes a search condition formula generation means that generates a search condition formula from the user information specified by a user identifying means and from a keyword and a search means that searches an index which is in meeting with the search condition formula from the index storage means.

FIG. 1 is a diagram illustrating a configuration that holds the ACL right information beforehand on a search server side. This configuration corresponds to the configuration disclosed in the above mentioned Patent Document 1. Non-Patent Document 1 also shows a similar configuration. FIGS. 1 and 2 are newly drawn by the present inventors to illustrate the background of the present invention.

A search server 1 acquires beforehand ACL information (_acl) 5 of a document from a repository 3, in which the ACL information is stored. The search server 1 stores the so acquired ACXL information in e.g., a database, not shown. The search server 1 matches an index 4, which corresponds to a search condition, to the ACL information (_acl) 5 (e.g., AND operation), and outputs a document, to which a user, who has issued a search request, has an access right, as a search result to the user. An authentication server 2 checks whether or not a user is a registered one by matching of a password the user entered when logging in. The authentication server 2 is such as ADS (Active Directly Server) or the Windows (registered trademark) Server.

FIG. 2 shows how the search server 1 checks to see whether or not there exist an access right when outputting a search result. In outputting the search result document in response to a search request, an ACL checker 6 confirms an access right to document(s) of interest, stored in the repository 3, and selects document(s) to which the user has an access right to output the document(s) selected to a search result list. With this technique, the search result that reflects the latest ACL may be obtained at all times. Unlike the configuration of FIG. 1, it is unnecessary to hold the ACL information in the search server 1.

Patent Document 1:
JP Patent Kokai Publication No. JP-P2001-344245A
Patent Document 2:
International Patent Kokai No. 2008/044542 pamphlet (WO 2008/044542A1)
Non-Patent Document 1:
Christopher D. Manning, Prabhakar Raghavan and Hinrich Schutze, Introduction to Information Retrieval, Cambridge University Press, 2008, pp. 61-77, <URL>http://www-cs-li.stanford.edu/-hinrich/Information-Retrieval-book.html Retrieved on November 2008

DISCLOSURE OF THE INVENTION

Problems To Be Solved By The Invention

SUMMARY

The following describes an analysis by the present invention.

In the technique of FIG. 1, the ACL information is stored and held on the search server side, and hence the technique is optimum in search performance. However, the technique is beset with the following problems:

That is, the ACL information, stored and held by the search server, is not necessarily the latest. There is thus a possibility that a document, to which no access right is currently allowed, is output as a search result. The search server 1 of FIG. 1 generates the ACL information (_acl) as bit information that maps a user and a document in a one to one correspondence, as shown in FIG. 3 (indexing). See Non-Patent Document 1. An ACL index (list), which includes bit information that assumes the value of 1 or 0 in case a document can be referenced (can be read) or otherwise, respectively. However, if the ACL information is generated by indexing as the information that maps a user and a document in a one to one correspondence, a computation amount for update processing of the ACL index (_acl) is increased, thus raising an update cost. For example, if a user is newly added, a record (a bit string that specifies an access right 'reference allowed' or 'not allowed') from one document to another is added for each new user. At this time, the ACL information of the entity of documents to be searched is acquired. Also, if a document is changed, a column for each user, whose access right to the document of interest is controlled, is changed in its entirety. The entirety of records may need to be corrected, depending on data structure.

On the other hand, the technique of FIG. 2 suffers from the following problems.

When outputting the search result, overheads for the ACL check of documents equal to the number of outputs are needed, thus deteriorating the search performance. Moreover, if the number of the search results (number of documents) is to be displayed correctly, ACL check has to be carried out for the entirety of documents of the search results, thus appreciably deteriorating the search performance. That is, a response time from inputting of a search request to outputting of the number of search results is appreciably prolonged. ACL check is time-consuming and response is delayed, but if the number of search results is wholly not displayed, it may turn out to be unkind for the user. On the other hand, if the number of search results before ACL check is displayed, security problems may be produced. Hence, ACL check before outputting the number of search results is indispensable. The technique of FIG. 2, low in ACL update cost, is thus high in search cost.

Hence, in general, one or combination of the techniques of FIGS. 1 and 2 may be used to implement a search system. In enterprises or public offices, the access right to documents may be varied. For example, branches or competences are changed with personnel movements in firms or public offices. There are thus occasions where a person who formerly had a right to read now has no longer such right.

In the Time-Travel search (registered trademark of the present Assignee (see Patent Document 2 for instance), a search based on past information space has been implemented. However, no measures have been taken in connection with ACL search or access right changes.

The present inventors have now arrived at an invention on ACL search that may be applied to Time Travel search, for instance, as set out below.

It is an object of the present invention to provide a system, a method and a program for information processing in which update processing of access control information is well-balanced with respect to search performance in case access right is taken into account.

The invention may be summarized substantially as follows, but not limited thereto:

In one aspect of the present invention, there is provided an information processing system comprising a storage unit that stores correlation between a set of retrievers and access right to information to be searched; and means that makes reference to the access right to the information to be searched of the set of retrievers to which belongs the retriever to derive access right to the information to be searched of the retriever, and takes, from among the information searched in response to a request for search from the retriever, the information, reference to which by a retriever is allowed, as a search result.

The information processing system according to the present invention further comprises:

means that analyzes information from information storage means storing therein the information to be searched, and creates an index for search to store the index for search in a storage unit;

index update means that includes means that creates, from access control information storage means storing access control information therein, an access control entry in association with the index for search to store the access control entry in a storage unit, the access control entry correlating the information to be searched with access right of at least a group to which a user belongs, wherein the retriever and the set of retrievers are managed as a user and as a group, respectively;

ACL cache generation means that creates access control cache data which correlates a user with access right to the information to be searched, from the access control entry, and registers the access control cache data created in a cache; and search processing means that searches the index for search in response to a request for search from the user, the search processing means, in case the access control cache data correlated with the user and the index for search is registered in the cache, taking information, reference to which is allowed for the user, from among the information searched, as a search result, based on the access control cache data registered in the cache.

In another aspect of the present invention, there is provided an information processing method comprising storing correlation between a set of retrievers and access right to the information to be searched in a storage unit; and referencing to the access right to the information to be searched by the set of retrievers to which belongs the retriever and deriving access right of the retriever to the information to be searched, based on correspondence relation of the retriever and the set of retrievers; and taking information, reference to which by the retriever is allowed, from among information searched in response to a request for search from the retriever, as a search result.

In a further aspect of the present invention, there is provided a computer-readable recording medium storing a program causing a computer, capable of referencing to a storage unit storing therein correspondence between a set of retrievers and information to be searched, to execute referencing to access right to the information to be searched of the set of retrievers to which belongs the retriever and deriving access right of the retriever to the information to be searched, based on correspondence relation of the retriever and the set of retrievers; and taking information, reference to which by the retriever is allowed, from among the information searched in response to a request for search from the retriever, as a search result.

In a further aspect of the present invention, there is provided a search apparatus comprising a storage unit that stores, as information for managing access right to a document, an access control entry including an information structure that correlates a document ID with a group ID on a per group basis, said group including a plurality of users, wherein said search apparatus executes matching of access right to a document, searched in response to a request for search by a user, in terms of a group to which belongs said user as a unit, or in terms of a user as a unit, based on correlation between said user ID and said document ID, derived from information of said access control entry, and extracts a document that meets with access right of said user from among documents which meet with a condition for search.

According to the present invention, said access control entry includes, as said access right for at least a group ID, correlation of a document ID, reference to which is allowed for said group ID and a document, reference to which is not allowed for said group ID, and wherein said search apparatus out of documents that meet with said search condition, generates a list of documents, reference to which is allowed and reference to which is not denied.

According to the present invention, correlation between said user ID and group ID is derived beforehand from information in said access control entry or is derived in response to a request for search from said user.

According to the present invention, the search apparatus comprises means that derives correlation between said user ID and said document ID from information in said access control entry, and that stores, in a cache, correlation of a key including said user ID with a document ID, reference to which is allowed for said user ID, wherein a list of documents that meet with said search condition and also with access right of said user is generated by referencing to said cache.

According to the present invention, update processing of access control information may be balanced with search performance in which an access right is taken into account.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a diagrammatic diagram for illustrating ACL cache data in the exemplary embodiment of the present invention.

PREFERRED MODES

The following describes the preferred exemplary embodiments of the present inventions will now be described. It is costly processing for a search server to hold the ACL information in the configuration shown in FIG. 1. In an actual user management system, a plurality of users are collected together in a group, and access control is exercised e.g., from one group to another.

According to the present invention, an access control entry (ACE), which is a list for access control that manages 'reference allowed'/'reference not allowed' from one document to another on the user basis/the group basis, is generated, and calculations are then performed for access rights matching. By controlling an access right on a per group basis, it is possible to reduce cost as well as load in ACL index update processing that is caused by mapping between a user and a document.

Figure 4:
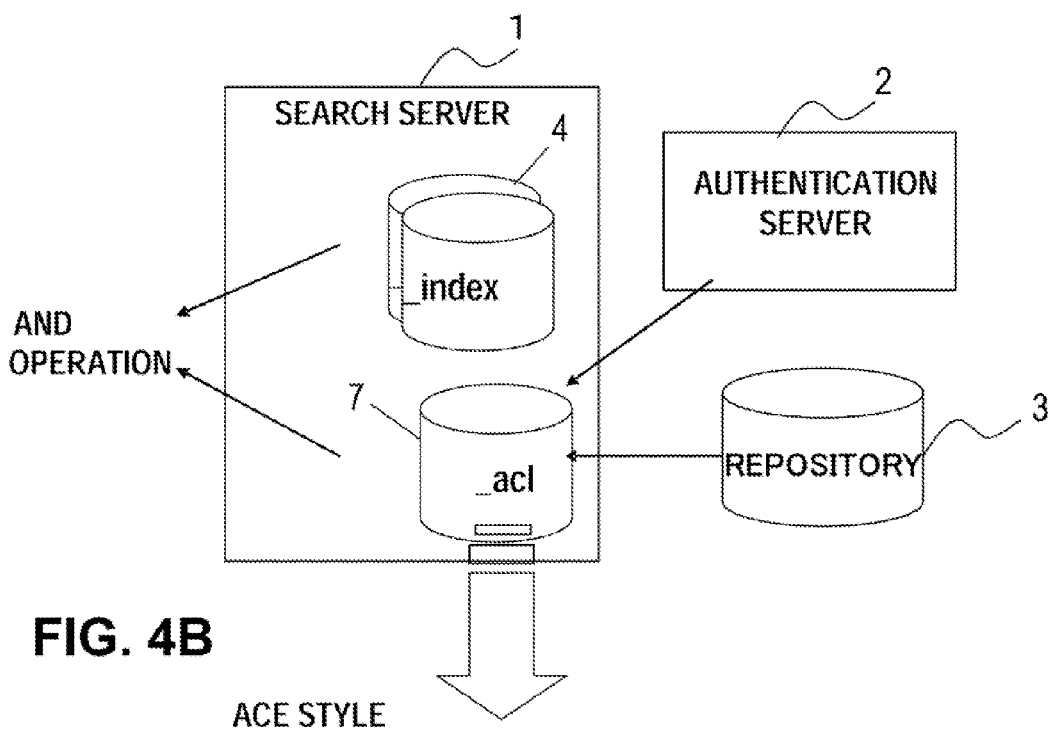
FIGS. 4A and 4B are schematic diagrams illustrating ACE in ACL search.

Referring to FIG. 4A, the search server 1 holds, as ACL information (_acl) 7, an access control entry (ACE) shown in FIG. 4B. In the access control entry (ACE), the relationship of correlation between a user ID (user's system ID)/a group ID (group's system ID) and a document ID (docID) is stored for each reference disabled (denied for reference) field and for each reference enabled (allowed for reference) field. The reference disabled (denied for reference) field is a DOMAIN.DENY field and the reference enabled (allowed for reference) field is a DOMAIN.ALLOW field. In the example of FIG. 4B, a user 1 (User1_sid) is denied (disabled for reference) to document IDs 1, 2 and 4, and a user 2 (User2_sid) is denied to document IDs 1, 2, 5 and 7. A group 1 (Group1_sid) is denied to document IDs 2 and 3, and everyone (other than a system administrator) is denied to document IDs 1, 2, 3, 4 and 5. A user 1 (User1_sid) is allowed to a document ID7, a group 1 (Gruop1_sid) is allowed to a document ID6 and everyone (other than a manager) is allowed to a document ID8. A document list of documents allowed (ALLOW) and not denied (not DENY) is output.

Figure 2:
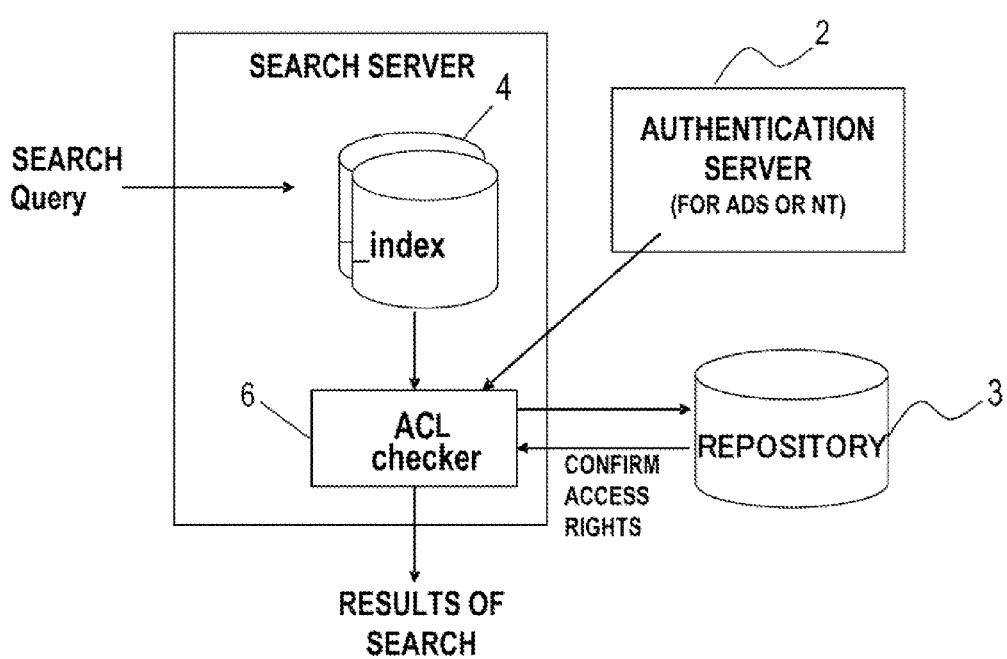
FIG. 2 is a schematic diagram illustrating a typical example 2 of ACL search.
Figure 3:
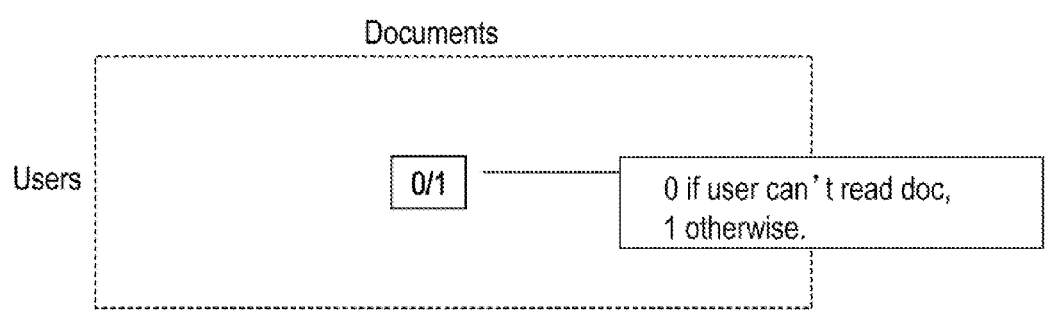
FIG. 3 is another schematic diagram illustrating a typical example 1 ACL search.

In the ACL check by the technique of FIG. 2, as a Comparative Example, search processing needs to be carried out for the entirety of users' own user ID, group ID of the group to which belongs the user and user IDs for everyone, both for DENY and ALLOW. This increases the number of times of disc random read operations.

According to the present invention, the access control entry (ACE) that allows the reference allowed/reference not allowed to be controlled on the group basis, as shown in FIG. 4B, is used for holding the ACL index and, basically, ACL index is updated on a per group basis. For example, when one user is to be added, no record is added except if a group is to be added or modified. The operation of acquiring the ACL information of the entirety of documents to be searched is also unnecessary. As a result, the problem of high cost (high load) of ACL index update processing may be eliminated to improve processing efficiency. It should be noted that not only access control information which enables reference allowed/reference not allowed to be controlled on a per group basis, but also access control information which enables reference allowed/reference not allowed to be controlled on a per user basis may, of course, be set in the access control entry (ACE).

Moreover, according to the present invention, the ACL information, stored in an index storage part, may be held in an ACL cache (ACL Cache List) to reduce search time, thereby eliminating the problem of high search cost such as that caused in the technique of FIG. 2.

According to the present invention, an ACL cache may be provided in association with a differential index (divisional index) that holds an index by means of which a document list that may be referenced will be acquired quickly. The information of the ACL cache (ACL Cache List) may optionally be exploited to acquire the ACL information associated with past divisional indices.

According to the present invention, an ACL index (ACE information) may be generated/updated in real time, only for the latest search, when search is requested.

According to the present invention, an index for search may be of a divisional index configuration partitioned composed of a plurality of sections, and an ACL index is retained in association with the divisional index configuration. By so doing, past ACL may be restored by, for example, Time Travel search. That is, past divisional indices may be ACL-searched in accordance with the past ACL. The divisional index configuration of the present invention is not limited to the time-series based divisional indices, obtained on partitioning an index in the time domain, and may be any optional divisional indices.

Figure 5:
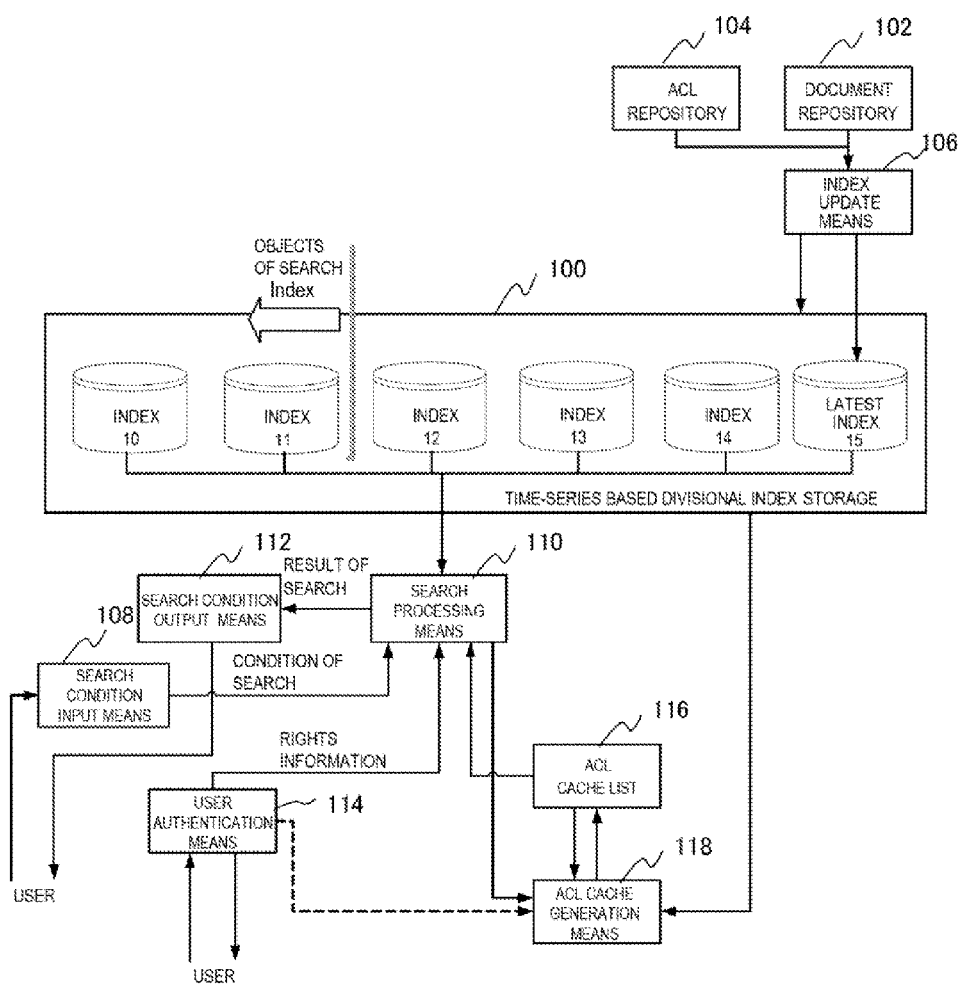
FIG. 5 is a schematic block diagram for illustrating the configuration of the exemplary embodiment of the present invention.

FIG. 5 is a diagram showing a configuration of a first exemplary embodiment of the present invention. Referring to FIG. 5, the configuration includes a time-series divisional set index storage unit 100, a document repository (an information storage means) 102, an ACL repository (an access control information storage means) 104, an index update means (unit) 106, a search condition input means (unit) 108, a search processing means (unit) 110, a search result output means (unit) 112, a user authentication means (unit) 114, an ACL cache (ACL Cache List).116 and an ACL cache generation means (unit) 118.

The time-series based divisional index storage unit 100 includes divisional indices 10 to 14, which are past divisional indices, and a latest index 15. Although there are provided five divisional indices in FIG. 5, there is no limitation to the number of the indices. In the following description, the divisional indices are divisional time-series based indices. However, according to the present invention, the divisional indices are of course in no way limited to the divisional time-series based indices.

Each of the divisional indices 10 to 14 includes an index for search and an ACL index (ACE scheme). The ACL index is held in accordance with ACE (Access Control Entry) scheme which includes an access control list that, controls reference allowed/not allowed on a per group basis. The time-series divisional index storage unit 100 is composed by a storage apparatus, such as a storage.

The document repository 102 is a storage apparatus/system in which documents that may be objects for search in a search system are stored. The document repository may, for example, be composed by a file server.

The ACL repository 104 includes a software that manages e.g., access right to be provided to a user in connection with documents stored in the document repository 102. For example, the ACL repository 104 may includes software on a file server, such as linux permission or Windows (registered trademark) OS.

The index update means 106 registers/updates an index for search of a document stored in the document repository 102 and an ACL index of the ACL repository 104. The index for search is generated by file analysis, index word extraction or by inverted indexing.

The index update means 106 updates the divisional indices either periodically or by setting entered by an administrator. For example, the divisional index 11 is updated to the divisional index 10, the divisional index 12 is updated to the divisional index 11 and so forth until the latest index 15 is updated to the index one generation before 14, by way of updating generation-by-generation for each divisional index. The latest index is set so as to be a null index. In keeping with the generation update of the divisional indices, the generations of the ACE (ACL indices) contained in the divisional indices are also updated.

The search condition input means 108 is an interface via which a user enters a search condition. The search condition input means 108 performs the function of specifying a search condition(s), such as a search keyword used in search or information used as base point for search, such as time information, e.g., year/month/date information. The search condition input means 108 transmits the so specified search condition(s) to the search processing means 110. The information used as the base point of search may be time-relevant trigger information, such as an event, in addition to the time information such as year/month/date information or hour/minutes. As one example of the search condition input means 108, an input box for search keywords, entered on the user's Web browser, for example, may be used.

The search processing means 110 performs keyword search. A method for search with a single index for search may be carried out by a state-of-the-art search technique in information search.

The search processing means 110 receives the search condition(s) from the search condition input means 108 as input. In case the time condition for an object of search is specified in the search condition(s), the divisional indices for time previous to the specified time are searched. If no time conditions are specified, the latest index is searched. In FIG. 5, the divisional indices 10, 11, indicated by an arrow, are taken to be objects for search. The search processing means 110 further includes an ACL search function. The ACL search is performed on the time-series based divisional indices as reference is made to the ACL information of the ACL cache 116. This ACL search processing will be described subsequently.

The search result output means 112 is an interface via which the results of search by the search processing means 110 are displayed. The search result output means 112 performs the role of receiving the results of the search processing carried out by the search processing means 110 to output them as results of search to a user. As one example of the search result output means 112, software for outputting a list of results of search to a Web browser of the user may be used.

The user authentication means 114 is a system to do user's authentication. It matches a user's name and user's password entered when a user login to a user's name and a password registered. The user authentication means 114 is coordinated with user's rights in the document repository 102 and in the ACL repository 104. The user authentication means 114 is implemented by, for example, a NIS (Network Information Server) or a Windows (registered trademark) domain controller.

The ACL cache generation means 118 generates ACL cache data.

The ACL cache 116 is held on a storage unit. The ACL cache is held on a per divisional index basis.

FIG. 6 shows an example of data stored in the ACL cache 116. The data includes a record of bit map form (READ enable flag) in relation to each search key (user ID plus index ID). The user ID in "user ID plus index ID" corresponds to the ID (identification information) of the user who logged in (source of search request) and the index ID in "user 1D plus index ID" corresponds to the ID of the divisional index of the time-series based divisional index storage unit 100. The READ enable flag assumes a value of 1 in case the document corresponding to the bit in question indicates READ enabled, while assuming a value of 0 otherwise. If the record of the READ enable flag is "10101011', for example, and the right most bit denotes the document 1, the documents 1, 2, 3, 4, 5, 6, 7, 8, . . . are for READ enabled, READ disabled, READ enabled, READ disabled, READ enabled, READ enabled, . . . .

For the latest index 15, when it is updated frequently, no cache data is generated/registered.

The ACL cache generation means 118 generates data written in the ACL cache 116 when a user login. If the ACL cache 116 has been cached out, the ACL cache generation means 118 generates ACL cache data in the so cached-out region. Cache control suited for the currently usable memory amount in the search server, such as control for caching out LRU (Least Recently Used) data, may be adopted.

One record-one index correspondence is not necessary, that is, each record shown in FIG. 6 may be segmented.

In the present exemplary embodiment, functions and processing of the index update means 106, search processing means 110, search condition input means 108, search result output means 112, ACL cache generation means 118 and the user authentication means 114 may be implemented under a program control by a program executed a computer.

The divisional indices 10 to 14 and the latest index 15 are indices which are to be used for search processing and which have been partitioned in time series by some trigger(s) or other. The latest updated divisional index is to be the latest index.

The index update means 106 indexes a new document or an updated document to register the so indexed document in the latest index at all times. The index update means 106 generates/updates the ACL index of a document of interest in accordance with an ACE form to register/update it in the latest index 15.

The divisional indices 10 to 14 and the latest index 15 are saved in an ordinary file format or as a record in a database. The divisional indices 10 to 14 and the latest index 15 may be saved in different storage units or in the same storage unit.

Figure 1:
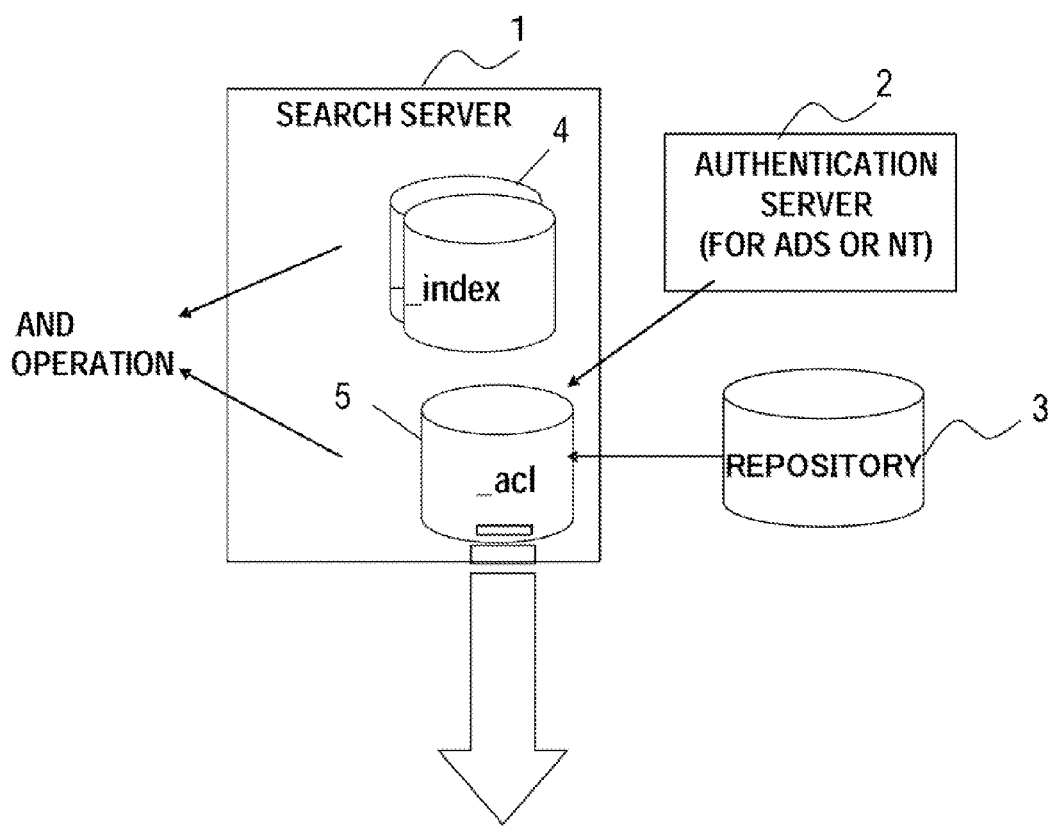
FIG. 1 is a schematic diagram illustrating a typical example 1 of ACL search.

In the present exemplary embodiment, the ACL information is saved in the index basically in accordance with the format shown in FIG. 1. The ACE (Access Control Entry) information is constructed as an inverted index with a user ID and a group ID being treated as index words. That is, the user ID and group ID are correlated with the document ID. The ACE information is partitioned into a plurality of time-series sections in association with the divisional indices.

In connection with, access rights to documents, a plurality of inverted indices, representing DENY and ALLOW, are further generated. In terms of ACE, a document that is not contained in the DENY field and is contained in the ALLOW field represents a document which is endowed with an access right.

The search processing means 110 performs search processing of {user ID (one)+group ID(s) (as many as there are group ID(s) to which belongs the user)+everyone (one)}, in the DENY field of the ACE information. The search processing means 110 takes OR (logical sum) of the search processing operations to prepare a document ID list.

The search processing means 110 performs search processing of {user ID (one)+group ID(s) (as many as there are group ID(s) to which belongs the user)+everyone (one)}, in the ALLOW field. The search processing means then takes OR (logical sum) of the search processing operations to prepare a document ID list. The documents contained in the ALLOW field minus the documents contained in the DENY field will yield documents with access rights.

The above mentioned search processing is time-consuming. Hence, in the present exemplary embodiment, there is provided a cache for a user ID and a document ID list. When a user login or when a first search is executed, the ACL cache generation means 118 (FIG. 5) generates ACL cache data.

Figure 7:
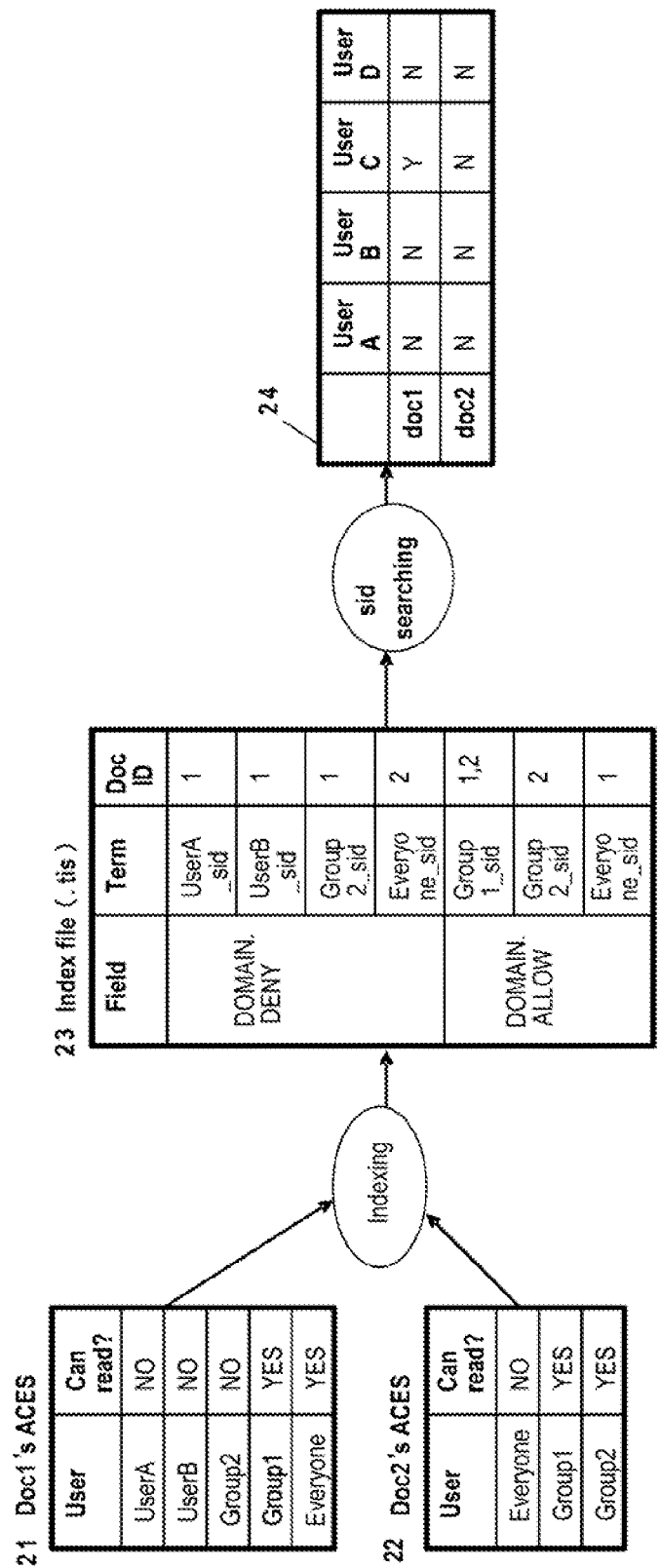
FIG. 7 is a diagrammatic diagram for illustrating storage and matching of the ACL information in the exemplary embodiment of the present invention.

Referring to FIG. 7, generation of the ACL cache by the ACL cache generation means 118 will be described. It is now assumed that a group 1 includes users A to C and that a group 2 includes the user A and a user D. It is also assumed that there are documents 1 and 2 (Doc1 and Doc2) as documents for indexing.

It is seen from ACE (Access Control Entry) 21 of the document 1 (Doc1) that reference is disable for the users A and B and the group 2, while reference is enable for the group 1 and for everyone. It is also seen from ACE (Access Control Entry) 22 of the document 2 (Doc2) that reference to the document 2 is disabled for everyone, while being enabled for the groups 1 and 2.

The ACL cache generation means 118 indexes the ACE 21 of the document 1 and the ACE 22 of the document 2 to generated an index file 23 in accordance with the ACE scheme shown in FIG. 4B. The index file 23, representing the correlation between the user/group and the document IDs, is generated for the DENY field and for the ALLOW field.

The ACL cache generation means 118 then searches for the user sid (system ID) from the index file 23 to generate ACL cache data 24 indicating reference allowed (Y) and reference not allowed (N) between the documents and the users. To get ACL cache data of the user A, for example, the ACL cache generation means 118 generates a DENY list for the user A, groups 1 and 2 and everyone-id from the DENY field of the index file 23. The ACL cache generation means 118 generates an ALLOW list for the user A, groups 1 and 2 and everyone_id from the ALLOW field of the index file 23.

If a document in question is not in the ALLOW list, referencing (READ) of the document by the user A is denied. If the document is in the ALLOW list and is not in the DENY list, referencing (READ) of the document by the user A is allowed. The same applies for the users B, C and D, that is, ACL cache data is derived and stored in the ACL cache 116. The ACL cache data (access control information with bit map format), once stored in the ACL cache 116 and cached out, may be saved in a storage unit, such as a disc. If the ACL cache data is needed at the time of next search or login, the data may be read out from the storage unit and saved in the ACL cache 116 instead of newly preparing ACL cache data from the ACE.

Figure 8:
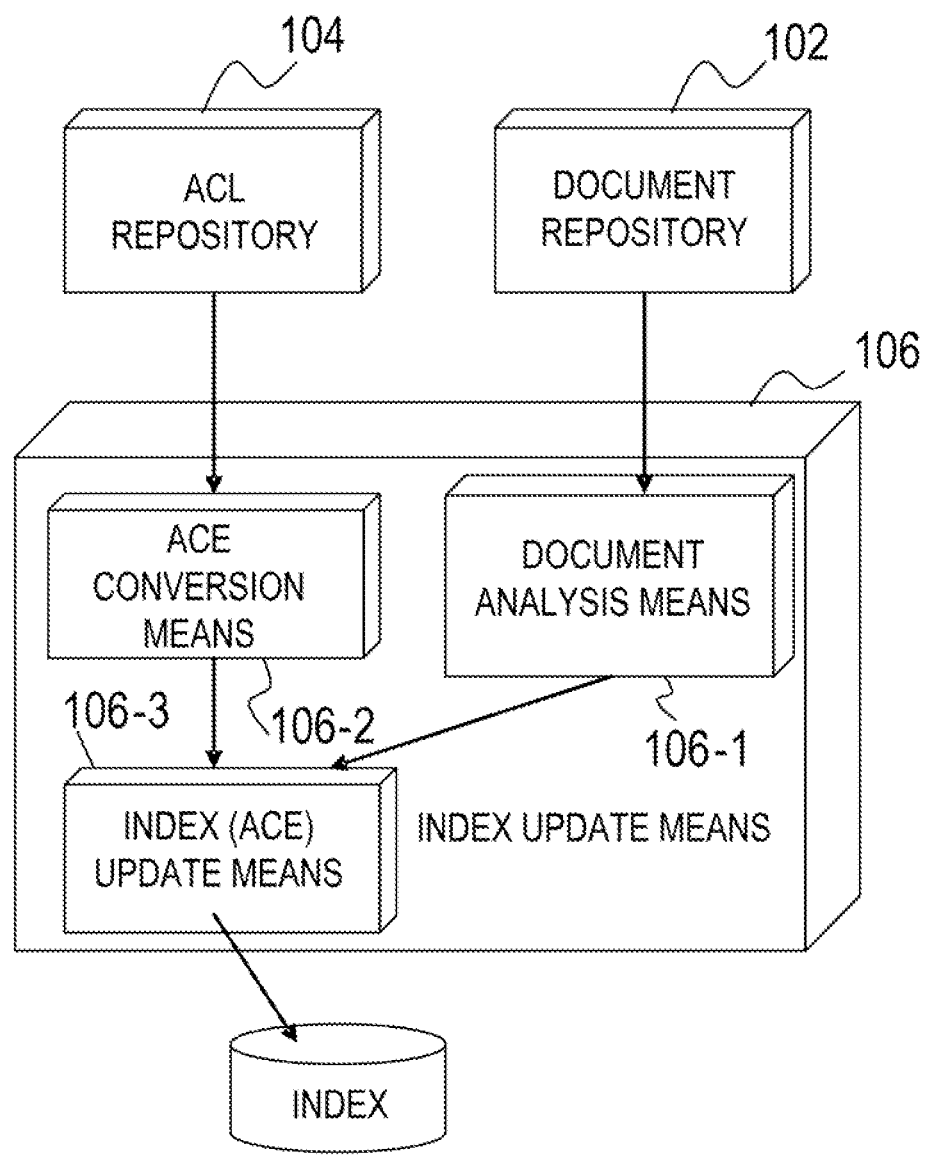
FIG. 8 is a schematic diagram for illustrating the configuration of an index update means in the exemplary embodiment of the present invention.

FIG. 8 is a diagram showing an arrangement of the index update means 106 of FIG. 5. Referring to FIG. 8, the index update means 106 will now be described. The index update means (unit) 106 includes a document analysis means (unit) 106-1, an ACE conversion means (unit) 106-2 and an index (ACE) update means (unit) 106-3.

The document analysis means 106-1 executes format conversion, index word extraction and inverted indexing of documents in the document repository 102.

The ACE conversion means 106-2 converts the ACL information of the ACL repository 104 into the ACE style information. That is, the information as to whether or not a document of interest is or is not accessible for the group or the user of interest is extracted. The ACE conversion means 106-2 effects conversion from permission, an access right mechanism of Linux, for example, into ACE.

The index (ACE) update means 106-3 updates indices for search and the ACL information (ACE). The index update means 106 saves latest registered indices as a difference from the indices of the previous generation. In the present exemplary embodiment, the index update means 106 saves just the differential information for divisional indices next following a past reference divisional index. Hence, the indices may be stored at a high speed in a storage unit, and addition/update processing for the indices may also be carried out quickly.

The following describes the sequence of search processing in the present exemplary embodiment.

Figure 9:
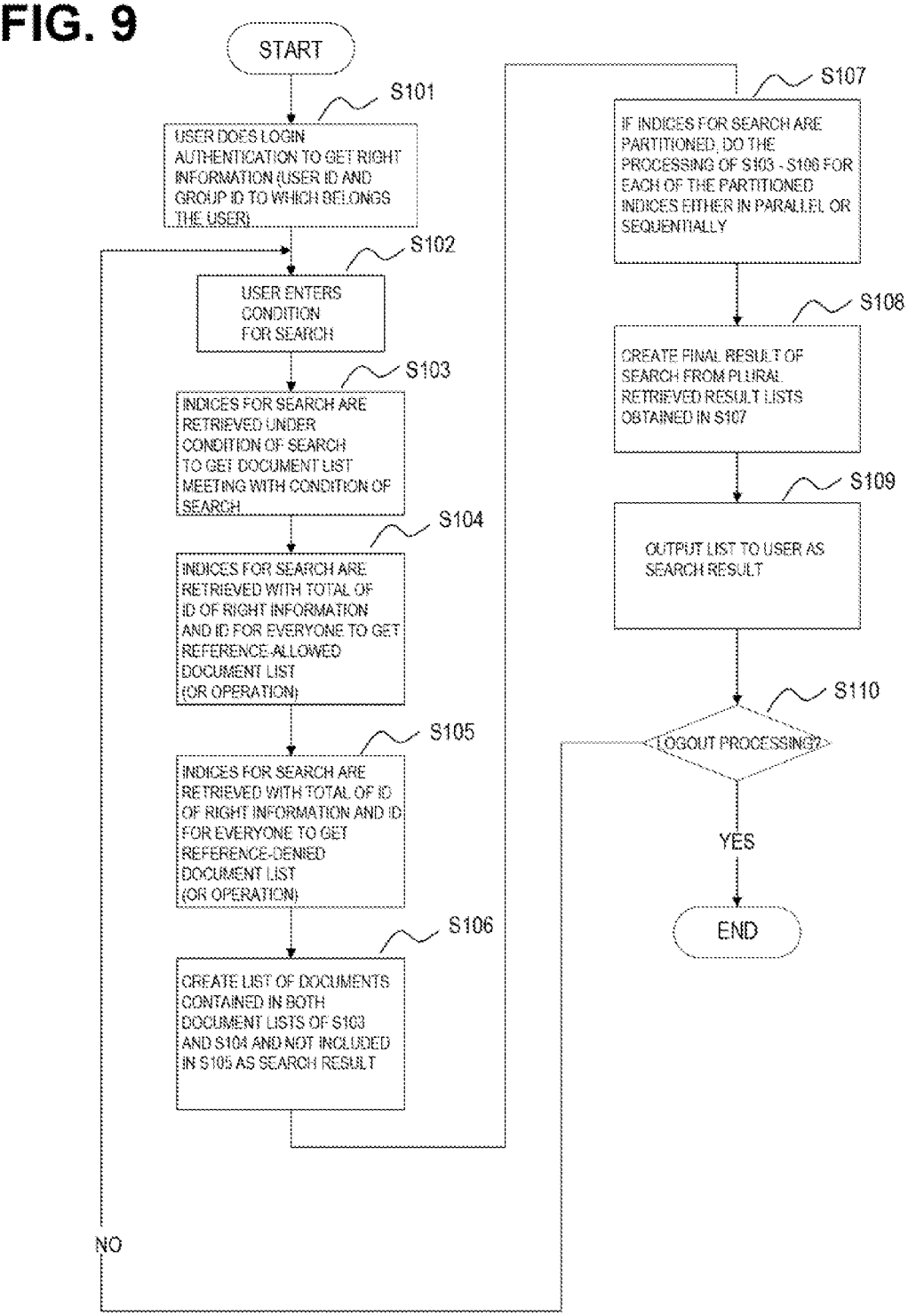
FIG. 9 is a flowchart for illustrating search processing of the exemplary embodiment of the present invention devoid of ACL caching.

FIG. 9 is a flowchart for illustrating the search processing in case of not using the ACL cache in the present exemplary embodiment. Referring to FIGS. 9 and 5, the sequence of search processing operations (without ACL caching) will now be explained.

When a user login, the user authentication means 114 executes login authentication to get the right information (for the user ID and the group ID to which the user belongs) (step S101).

A user enters a search condition from the search condition input means 108 (step S102). As the search condition, a search keyword as well as time specifying information (optional information) for specifying a time interval of the divisional indices may be entered.

The search processing means 110 searches for the indices for search (divisional indices) in accordance with the search condition (keyword, time) to generate a document list including one or more documents that meet with the search condition (step S103).

The search processing means 110 searches for ACE by the entirety of the IDs of the right information (user ID and group ID) and everyone ID to take OR (logical sum) of results of the search to get a list of the reference allowed documents (ALLOW list) (step S104).

The search processing means 110 searches for ACE by the entirety of the IDs of the right information (user ID and group ID) and everyone ID to take OR (logical sum) of results of the search to get the reference-not allowed document list (DENY list) (step S105).

The search processing means 110 generates a list of documents contained in both the document list generated in the step S103 and the reference allowed document list generated in the step S104 (ALLOW list) and those not contained in the reference-not allowed document list (DENY list), generated in the step S105, as a search result (step S106).

In case the index for search is partitioned into a plurality of divisional indices and the range of search extends over a plurality of the divisional indices, the search processing means 110 reiterates the processing of the steps S103 to S106 for the plurality of divisional indices (step S107). If no time specifying information is specified, the search processing means 110 takes just the latest index 15 to be an object for search.

A list of final results of the search is generated from the document list of the multiple results of the search obtained in the step S107 (step S108).

The search result output means 112 outputs the results of search (step S109).

In case of the user not logging out (NO branching from step S110), processing as from step S102 is carried out. In case of the user logging out (YES branching from step S110), processing comes to a close.

Figure 10:
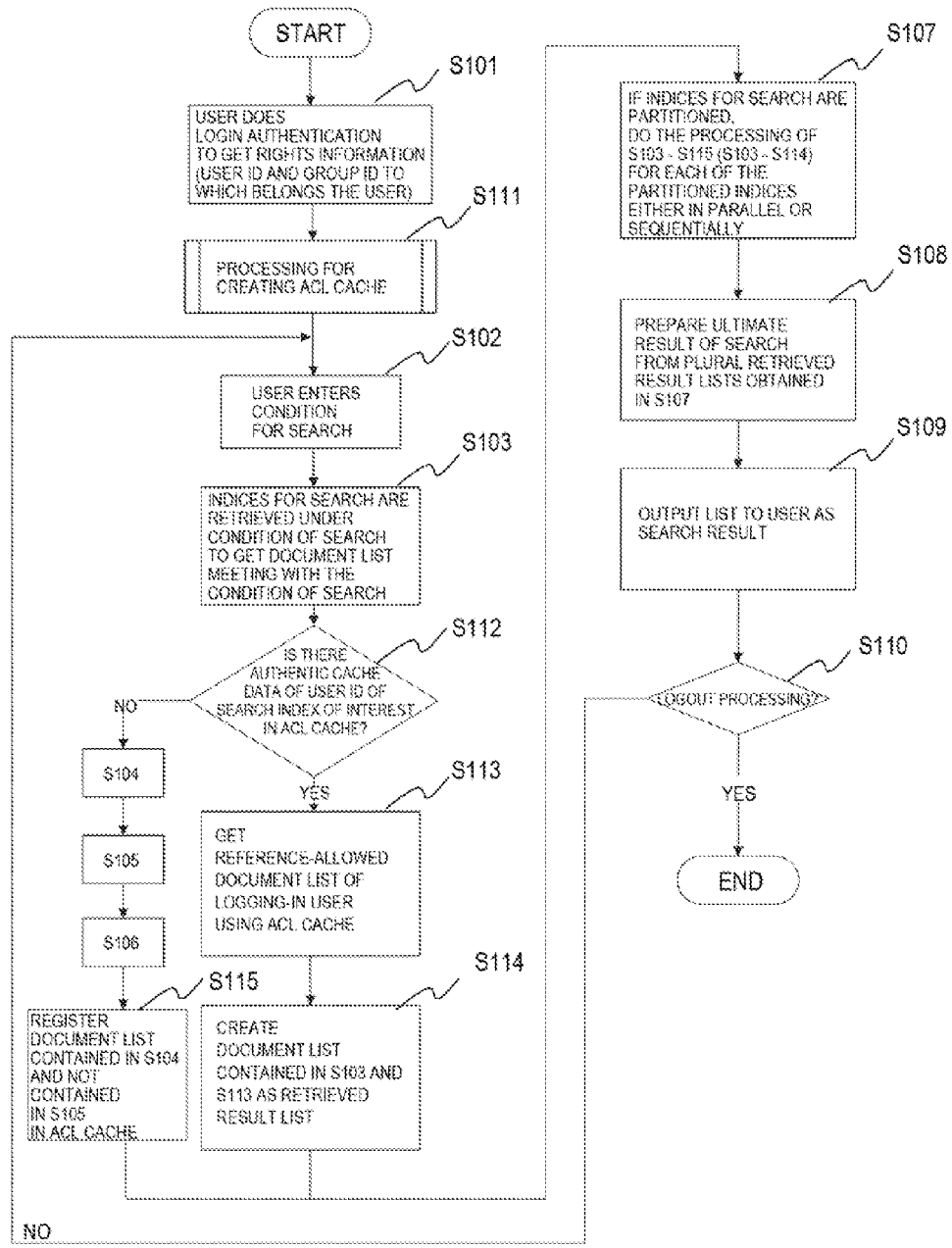
FIG. 10 is a flowchart for illustrating search processing of the exemplary embodiment of the present invention with ACL caching.

FIG. 10 is a flowchart for illustrating search processing in case ACL caching is used. Referring to FIGS. 10 and 5, the sequence of search processing operations of the present exemplary embodiment (with ACL caching) will be described.

When the user logs-in, the user authentication means 114 executes login authentication to get the right information (user ID and the group ID to which the user belongs) (step S101).

The ACL cache generation means 118 generates an ACL cache 116 (step S111). It is observed that the step S111 is invoked as a subroutine which will be explained later in detail.

The user enters the search conditions at the search condition input means 108 (step S102).

The search processing means 110 searches for indices for search (divisional indices) in accordance with the search condition (keyword/time) to generate a list of documents that are in meeting with the search conditions (step S103).

The search processing means 110 checks to see whether or not there is authentic cache data for the user ID for the index for search of interest in the ACL cache (step S112).

In case there is cache data, a reference allowed document list of the user ID who has logged in is obtained using ACL cache data (step S113).

The search processing means 110 generates, as a result of the search, a list of documents contained in both the document list generated in the step S103 and the reference allowed document list generated in the step S113 (step S114).

If conversely there is no cache data, the list of reference allowed documents is generated in the step S104, and the list of reference not allowed documents is generated in the step S105. A list of documents contained in the document list of the step S104 and in the reference allowed document list and not contained in the reference not allowed document list of the step S105 is generated. The steps S104, S105 and S106 may be the same with the steps S104, S105 and S106 of FIG. 9, respectively.

Next to the step S106, a list of documents contained in the reference allowed document list of the step S104 and not contained in the reference not allowed document list of the step S105 is registered as ACL cache data in the ACL cache 16 (step S115).

In case the index for search is partitioned into a plurality of divisional indices, the search processing means 110 reiterates the processing of the steps S103 to S115 for the plurality of divisional indices (step S107).

A list of final results of the search is generated from the multiple lists of the results of search obtained in the step S107 (step S108).

The search result output means 112 outputs the result of search (step S109).

Except in case of the user logging out ("NO" branching of the step S111), the processing as from the step S102 is carried out. In case of the user logging out ("YES" branching of the step S110), processing comes to a close.

Figure 11:
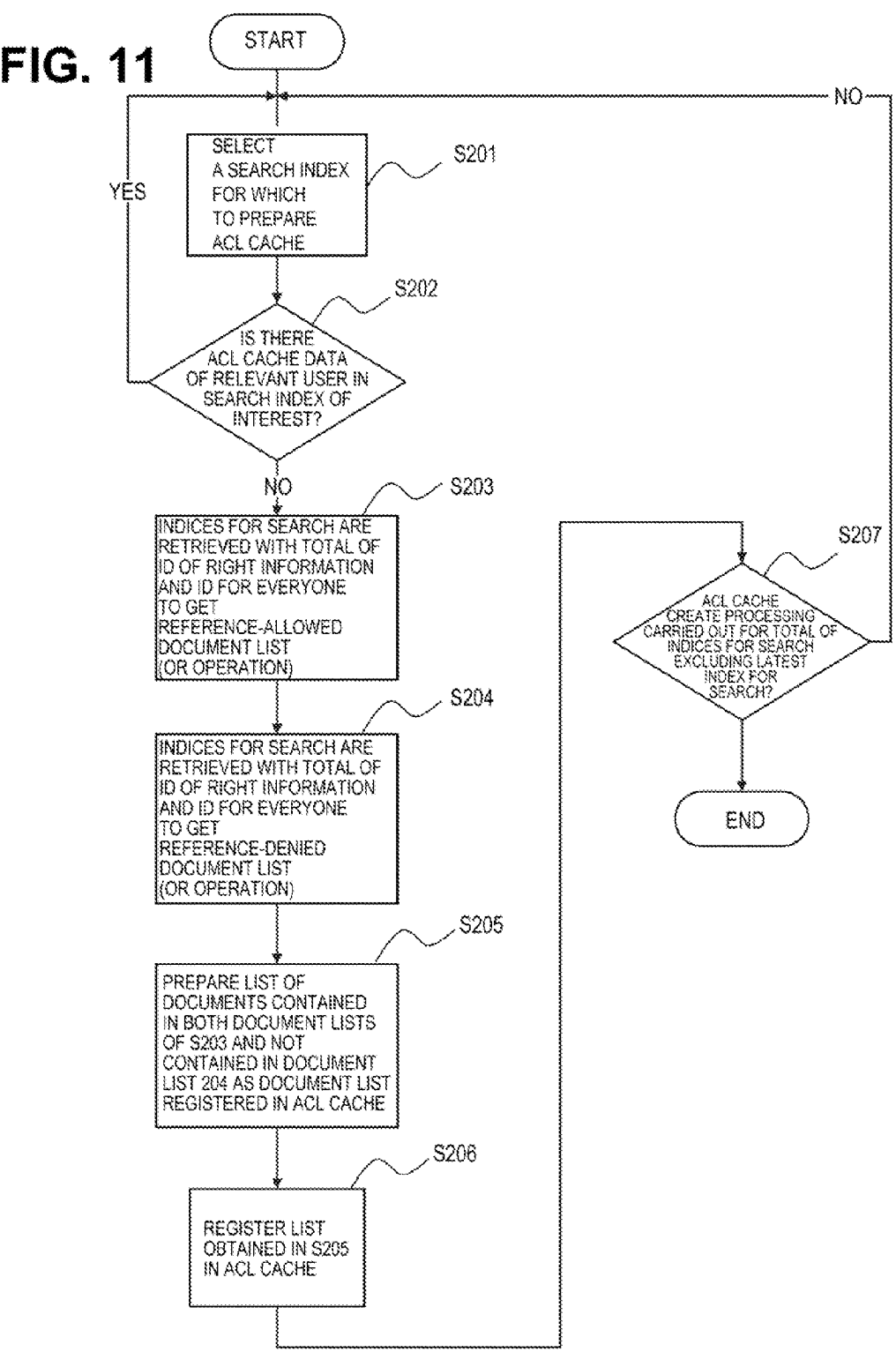
FIG. 11 is a flow chart for illustrating the processing of preparing ACL cache in the exemplary embodiment of the present invention.

FIG. 11 is a flowchart showing the sequence of processing operations of preparing the ACL cache of FIG. 10 (step S111). Referring to FIGS. 11 and 5, the sequence of operations of ACL cache formulation will be described.

The ACL cache generation means 118 selects an index for search for which the cache data (ACL cache data) to be registered in the ACL cache 116 is generated (step S201).

The ACL cache generation means 118 checks to see whether or not there is ACL cache data for the user, which is correlated with the index for search selected (step S202).

In case there is no ACL cache data (NO of the step S202), the ACL cache generation means 118 searches for the index for search with the entirety of IDs of the right information as acquired by the user authentication means 114 (user ID and group IDs of the groups to which belongs the user) and an ID for everyone. In this manner, the ACL cache generation means 118 gets reference allowed documents and then executes OR operations to generate a reference allowed document list (step S203).

The ACL cache generation means 118 searches for index for search, using the entirety of IDs (user ID and IDs of the groups to which the user belongs) of the right information and an ID for everyone in order to get the reference not allowed (DENY) documents. The ACL cache generation means then executes OR operations to generate a reference not allowed document list (step S204).

The ACL cache generation means 118 generates, as a list of documents registered in the ACL cache, a list of documents contained in the document list of the step S203 and not contained in the document list of the step S204 (step S205).

The ACL cache generation means 118 registers the document list, obtained in the step S205, in the ACL cache 116 (step S206).

It is checked whether or not the processing of generating the ACL cache data has been carried out for the entirety of the past divisional indices exclusive of the latest index (step S207). Except if the processing of generating the ACL cache data has been carried out for the entirety of the past divisional indices, processing as from the step S201 is executed. The steps S203 to S206 may be executed in parallel.

Figure 12:
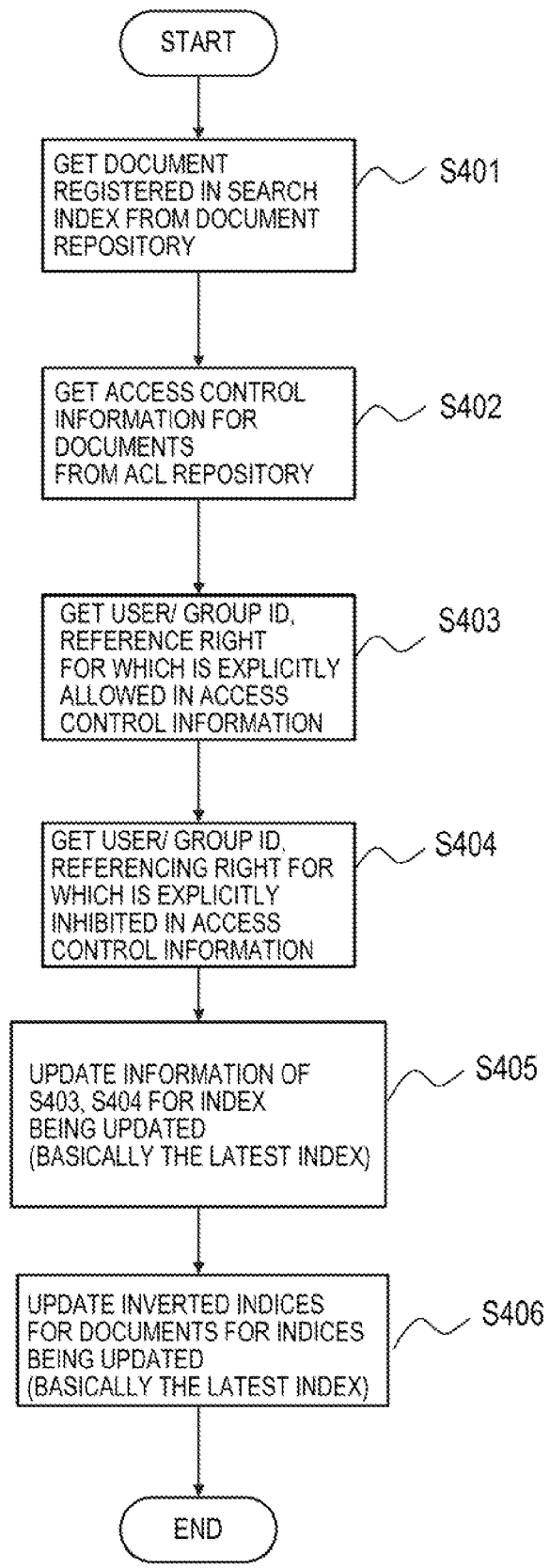
FIG. 12 is a flowchart for illustrating the processing of preparing an ACL index in the exemplary embodiment of the present invention.

FIG. 12 is a flowchart for illustrating the preparation of the ACL index by the index update means 106 in the present exemplary embodiment in the ACE style.

The index update means 106 acquires a document to be registered in the index for search from the document repository 102 (step S401).

The index update means 106 acquires access control information for the document from the ACL repository 104 (step S402).

The index update means 106 gets a user ID and a group ID, for which a right for reference is allowed explicitly in the access control information (step S403).

The index update means 106 gets the user ID and group ID, for which a right for reference is explicitly denied in the access control information (step S404).

The index update means 106 updates the information acquired in the steps S403 and S404 (ACL information indicating reference allowed/referencing not allowed for the user and group IDs) in relation to the index being updated (latest index) (step S405). The ACL information is stored in the ACE style shown in FIG. 4B.

The index update means 106 updates inverted indices of documents in relation to the index being updated (latest index) (step S406).

In the present exemplary embodiment, basically, the latest index is to be the index being updated. However, elder divisional indices may also be indices as update objects. In this case, such a mechanism is necessary whereby it may be confirmed whether or not, in exploiting and generating an ACL cache, the cache information thereof is the latest information. The ACL index is of such a data structure, in which a list of reference allowed or reference not allowed documents may promptly be acquired with the user or group list as a key. As an implementation example, the user or group ID is used as a key for an index word in an inverted index.

The following describes the advantageous effects of the present exemplary embodiment.

It is possible to construct an ACL search system in which ACL index update speed is balanced with respect to search speed. The ACL index update speed is improved by the inverted indexing by holding the ACL information with ACE format. The search speed is ascribable to the ACL cash.

Moreover, since the past ACE state is retained, the search exploiting it may also be made (state-of-the-art Time Travel search). In case just the latest ACE state is retained, search that takes past access rights into account may not be made.

Update with a heavy load need not be applied to past inverted indices. Past ACE indices are not updated.

ACL check processing is hidden by the ACL cache to achieve a high operating speed.

The ACL cache update frequency is reduced by a divisional index configuration.

In the present exemplary embodiment, in case of information search retrogressive towards the past, results of search based on ACL of past time points may be acquired. There are also cases where it becomes necessary to perform not only the search based on ACL of past time points but also the retrogressive information search towards the past based on the current access right. For example, it may sometimes occur that a user's access right is altered such that a document, the access right to which is formerly owned by the user, is currently not to be accessed by the user. As regards the ACL indices, past indices may be updated. However, if past indices are updated in this manner, an operation under such policy that documents visible at past time points are to be made an object of search may not be made. Hence, an update flag for a document is provided and, using this update flag, the latest ACL or the latest document state may be checked to reflect it in the result of search. By so doing, it is possible to perform the search based on current access rights in the Time Travel search provided with the ACL function. The existence of an updated more recent file may be displayed in relation to the result of search that has hit in the Time Travel search.

The whole or part of the exemplary embodiments disclosed above can be described as, but not limited to the following supplementary notes.

(Supplementary note 1) An information processing system of the exemplary embodiment comprises a storage unit storing therein correspondence between a set of retrievers and access right to information to be searched; and means that makes reference to access right of a set of retrievers to information to be searched, based on correspondence relation between a retriever and a set of retrievers to which said retriever belongs, and derives access right of said retriever to said information to be searched, said means, from among information searched in response to a request for search from said retriever, taking information, reference to which by said retriever is allowed, as a search result.

(Supplementary note 2) The information processing system according to Supplementary note 1, includes means that analyzes information from information storage means storing therein said information to be searched, and creates an index for search to store said index for search in a storage unit;

index update means that includes means that creates, from access control information storage means storing access control information therein, an access control entry in association with said index for search to store said access control entry in a storage unit, said access control entry correlating said information to be searched with access right of at least a group to which a user belongs, wherein said retriever and said set of retrievers are managed as a user and as a group, respectively;

ACL cache generation means that creates access control cache data which correlates a user with access right to the information to be searched, from said access control entry, and registers said access control cache data created in a cache; and search processing means that searches said index for search in response to a request for search from said user, said search processing means, in case said access control cache data correlated with said user and said index for search is registered in said cache, taking information, reference to which is allowed for said user, from among information searched, as a search result, based on said access control cache data registered in said cache.

(Supplementary note 3) The information processing system according to Supplementary note 2, wherein in case said access control cache data associated with said user and said index as an object for search is not registered in said cache, said search processing means creates, from said access control entry, access control cache data that correlates said user with access right to said information to be searched, said search processing means registering said access control cache data in said cache, and said search processing means taking information, reference to which is allowed for said user, from among information searched, as a search result, based on said access control cache data created.

(Supplementary note 4) The information processing system according to Supplementary note 2 or 3, wherein said access control entry stores an information ID in association with a group ID, for each of reference not allowed (DENY) field and reference allowed (ALLOW) field, said search processing means taking, in case access control cache data of said cache is not used, a list of information not included in said reference not allowed (DENY) field and included in said reference allowed (ALLOW) field, out of a list of information searched in accordance with a search condition that is included said request for search, as a search result.

(Supplementary note 5) The information processing system according to Supplementary note 4, wherein said search processing means registers a list of information not included in said reference not allowed (DENY) field and included in said reference allowed (ALLOW) field of said access control entry, in said cache, in association with said user.

(Supplementary note 6) The information processing system according to one of Supplementary notes 2 to 5, wherein a plurality of divisional indices are provided in said storage unit as said indices for search, said search processing means selecting one out of said plurality of divisional indices, based on a condition specified in said request for search, said search processing means executing search using said divisional index selected.

(Supplementary note 7) The information processing system according to Supplementary note 6, wherein said index update means updates an access control entry and an index for search of a preset divisional index out of said plurality of divisional indices.

(Supplementary note 8) The information processing system according to Supplementary notes 6 or 7, wherein said divisional indices are partitioned in time-series.

(Supplementary note 9) The information processing system according to one of Supplementary notes 2 to 7, comprising authentication means that performs authentication, when a user logs in, and acquires right information to supply said right information acquired to said search processing means and to said ACL cache generation means.

(Supplementary note 10) The information processing system according to one of Supplementary notes 2 to 9, comprising search condition input means that inputs time or trigger information, as a base point of search, as said search condition.

(Supplementary note 11) The information processing system according to Supplementary note 1, wherein a result derived of access right of said retriever to said information to be searched is held in a cache.

(Supplementary note 12) The information processing system according to Supplementary note 11, wherein said access right of said retriever to said information to be searched is derived when a request for search is issued by said retriever or when said retriever logs in.

(Supplementary note 13) An information processing method includes storing correlation between a set of retrievers and access right to the information to be searched in a storage unit; and referencing to the access right to said information to be searched by said set of retrievers to which belongs said retriever and deriving access right of said retriever to said information to be searched, based on correspondence relation of said retriever and said set of retrievers; and taking information, reference to which by said retriever is allowed, from among information searched in response to a request for search from said retriever, as a search result.

(Supplementary note 14) The information processing method according to Supplementary note 13, including:

analyzing information from information storage means in which said information to be searched is stored, and generating an index for search to store said index for search generated in said storage unit;

said retriever and said set of retrievers being managed as a user and a group, respectively;

said information processing method further comprising:

creating, from access control information storage means in which access control information is stored, an access control entry in association with said index for search, and storing said access control entry in a storage unit, said access control entry being correlation of said information to be searched with access right of at least a group to which said user belongs;

creating access control cache data that correlates said user with access right to the information to be searched, from said access control entry, and registering said access control cache data created in a cache; and searching said index for search in response to a request for search from said user and taking, in case said access control cache data correlated with said user and said index for search is registered in said cache, information, reference to which is allowed for said user, from among information searched, as a search result, based on said access control cache data in said cache.

(Supplementary note 15) The information processing method according to Supplementary note 14, including:

creating access control cache data that correlates said user with access rights to said information to be searched, from said access control entry, in case said access control cache data associated with said user and said index for search of interest is not registered in said cache;

registering said access control cache data in said cache; and taking information, reference to which is allowed for the user, from among information searched, as a search result, based on said access control cache data created.

(Supplementary note 16) The information processing method according to Supplementary note 13 or 14, wherein said access control entry stores an information ID in association with a group ID, for each of a reference not allowed (DENY) field and a reference allowed (ALLOW) field;

said search processing means taking, in case access control cache data of said cache is not used, a list of said information not included in said reference not allowed (DENY) field and included in said reference allowed (ALLOW) field, out of a list of said information searched in accordance with said search condition included said request for search, as a search result.

(Supplementary note 17) The information processing method according to Supplementary note 16, comprising registering, in said cache, in association with said user, a list of information not included in said reference not allowed (DENY) field and not included in said reference allowed (ALLOW) field of said access control entry, as a search result.

(Supplementary note 18) The information processing method according to one of Supplementary notes 14 to 17, wherein a plurality of divisional indices are provided in said storage unit as said indices for search;

said information processing method also comprising selecting one out of said plurality of divisional indices, based on a condition specified in said request for search, and performing said search using said divisional index selected.

(Supplementary note 19) The information processing method according to Supplementary note 18, comprising updating indices for search and an access control entry of a preset one of said plurality of divisional indices.

(Supplementary note 20) The information processing method according to Supplementary note 18 or 19, wherein said divisional indices are obtained on partitioning in the time domain.

(Supplementary note 21) The information processing method according to one of Supplementary notes 14 to 19, comprising performing authentication when a user logs in to acquire said right information to supply said right information acquired to said search processing step and to said creating access control cache data step.

(Supplementary note 22) The information processing method according to one of Supplementary notes 14 to 21, comprising inputting time or trigger information as a base point of search as said search condition.

(Supplementary note 23) The information processing method according to Supplementary note 13, wherein a result derived of access right of said retriever to said information to be searched is held in said cache.

(Supplementary note 24) The information processing method according to Supplementary note 23, wherein a result of access right of said retriever to said information to be searched is derived when a request for search is issued by said retriever or when said retriever logs in.

(Supplementary note 25) A program causing a computer, capable of referencing to a storage unit storing therein correspondence between a set of retrievers and information to be searched, to execute referencing to access right to said information to be searched of said set of retrievers to which belongs said retriever and deriving access right of said retriever to said information to be searched, based on correspondence relation of said retriever and said set of retrievers; and taking information, reference to which by said retriever is allowed, from among information searched in response to a request for search from said retriever, as a search result.

(Supplementary note 26) The program according to Supplementary note 25, causing the computer to execute analyzing information from information storage means storing said information to be searched therein, and creating an index for search to store said index generated in said storage unit, with said retriever being a user and with said set of retrievers being managed as a group;

index update processing that creates, from access control information storage means storing access control information therein, an access control entry in association with said index for search, and stores said access control entry in said storage unit, said access control entry being correlation of said information to be searched with access right of at least a group to which said user belongs;

ALC cache creating processing that creates access control cache data which correlates said user with access right to information to be searched, from said access control entry, and that registers said access control cache data created in a cache; and search processing that searches said index for search in response to said request for search from said user and that takes, in case said access control cache data associated with said user and said index for search is registered in said cache, information, reference to which is allowed for said user, from among information searched, as a search result, based on said access control cache data in said cache.

(Supplementary note 27) The program according to Supplementary note 26, causing the computer to execute creating access control cache data that correlates said user with access right to said information to be searched, from said access control entry, in case said access control cache data associated with said user and said index for search of interest is not registered in said cache;

registering said access control cache data in said cache; and taking information, reference to which is allowed for said user, from among information searched, as a search result, based on said access control cache data created.

(Supplementary note 28) The program according to Supplementary note 26 or 27, wherein said access control entry stores an information ID in association with a group ID, for each of a reference not allowed (DENY) field and a reference allowed (ALLOW) field;

said information processing taking, in case access control cache data of said cache is not used, a list of the information not included in said reference not allowed (DENY) field and included in said reference allowed (ALLOW) field, out of a list of the information searched in accordance with the search condition included said request for search, as a search result.

(Supplementary note 29) The program according to Supplementary note 28, wherein said search processing registers a list of the information not included in said reference not allowed (DENY) field and not included in said reference allowed (ALLOW) field of said access control entry in said cache, in association with said user.

(Supplementary note 30) The program according to one of Supplementary notes 26 to 29, wherein a plurality of divisional indices are provided in said storage unit as said indices for search, said information processing comprising selecting one out of said plurality of divisional indices, based on a condition specified in said request for search, and performing search using said divisional index selected.

(Supplementary note 31) The program according to Supplementary note 30, wherein said index update processing updates an access control entry and the indices for search of a preset one of said plurality of divisional indices.

(Supplementary note 32) The program according to Supplementary note 31, wherein said divisional index is obtained on partitioning in time-series.

(Supplementary note 33) The program according to one of Supplementary notes 26 to 32, causing the computer to execute authentication when a user logs in to acquire right information to supply said right information acquired to said search processing means and to said ACL cache generation means.

(Supplementary note 34) The program according to one of Supplementary notes 26 to 32, causing the computer to execute inputting time or trigger information as a base point of search as said search condition.

(Supplementary note 35) The program according to Supplementary note 25, causing the computer to execute storing a result derived of access right of said retriever to said information to be searched in said cache.

(Supplementary note 36) The program according to Supplementary note 35, wherein a result of access right of said retriever to said information to be searched is derived when a request for search is issued by said retriever or when said retriever logs in.

The disclosure of the aforementioned Patent Documents 1, 2 and Non-Patent Document 1 are incorporated by reference in the present Application. The particular exemplary embodiments or examples may be modified or adjusted within the gamut of the entire disclosure of the present invention, inclusive of claims, based on the fundamental technical concept of the invention. A large variety of combinations or selection of elements disclosed herein may be made within the framework of the claims. The present invention may encompass various modifications or corrections that may occur to those skilled in the art in accordance with and within the gamut of the entire disclosure of the present invention, inclusive of claims and the technical concept of the present invention.

What is claimed is:

1. An information processing system comprising:
a hardware processor;
a first memory storing a plurality of indexes having access control information, the plurality of indexes comprising a first index and a plurality of second indexes corresponding to versions of the first index; and
a second memory storing instructions,
wherein:
the first index stores, on a per-group basis, a list of one or more documents accessible by each group of a plurality of groups of users, and wherein:
the hardware processor is configured by the instructions to:
receive a search query; and
provide, in response to the search query, a first document from among the list of one or more documents based on the first index.

2. The information processing system according to claim 1, wherein the hardware processor is further configured to generate, from the first index, access control cache data which stores an access right of each of the users for each of the one or more documents, and register the access control cache data in a cache.

3. The information processing system according to claim 2, wherein the hardware processor is further configured to provide the first document by searching the access control cache data.

4. The information processing system according to claim 1, wherein the first index further stores:
on a per-group basis a list of one or more documents not accessible by each of a plurality of groups of users,
on a per-user basis for each of the users, a list of one or more documents accessible by each of the users, and
on a per-user basis for each of the users, a list of one or more documents not accessible by each of the users.

5. The information processing system according to claim 4, wherein the hardware processor is configured to provide the first document in response to the search query by:
determining a user associated with the search query;
determining a first plurality of documents that satisfy the search query and are accessible by the user or a group of the user, and
determining a second plurality of documents that are not accessible by the user or a group of the user.

6. The information processing system according to claim 5, wherein the hardware processor determines the user based on login information provided by the user.

7. The information processing system according to claim 5, wherein the first document is present in the first plurality of documents and not present in the second plurality of documents.

8. The information processing system according to claim 1, wherein the hardware processor is further configured to select one of the plurality of second indexes in response to the search query.

9. The information processing system according to claim 1, wherein the second indexes are a time-series of index files.

10. The information processing system according to claim 9, wherein the hardware processor is further configured to search a latest index in response to the search query.

11. The information processing system according to claim 1, wherein the search query includes time or trigger information as a search condition.

12. The information processing system according to claim 1, wherein the hardware processor is further configured to select the first index in response to the search query.

13. An information processing method comprising:
storing a plurality of indexes, the plurality of indexes comprising a first index and a plurality of second indexes corresponding to versions of the first index; and
providing by a hardware processor, in response to a received search query, a first document from among the one or more documents based on the first index; and
wherein:
the first index includes access control information and stores on a per-group basis, a list of one or more documents accessible by each group of a plurality of groups of users.

14. The information processing method according to claim 13, further comprising: generating, from the first index, access control cache data which stores an access right of each of the users for each of the one or more documents, and registering the access control cache data in a cache.

15. The information processing method according to claim 14, further comprising: providing the first document by searching the access control cache data.

16. The information processing method according to claim 13, wherein the first index further stores:
on a per-group basis a list of one or more documents not accessible by each of a plurality of groups of users,
on a per-user basis for each of the users, a list of one or more documents accessible by each of the users, and
on a per-user basis for each of the users, a list of one or more documents not accessible by each of the users.

17. The information processing method according to claim 16, wherein providing the first document in response to the search query includes:
determining a user associated with the search query;
determining a first plurality of documents that satisfy the search query and are accessible by the user or a group of the user, and
determining a second plurality of documents that are not accessible by the user or a group of the user.

18. The information processing method according to claim 17, wherein the user is determined based on login information provided by the user.

19. The information processing method according to claim 13, wherein the method further includes selecting one of the plurality of second indexes in response to the search query.

20. The information processing method according to claim 13, wherein the second indexes are a time-series of index files.

21. The information processing method according to claim 13, wherein the method further comprises searching a latest index in response to the search query.

22. The information processing method according to claim 13, wherein the search query includes time or trigger information as a search condition.

23. The information processing method according to claim 13, wherein the first document is present in the first plurality of documents and not present in the second plurality of documents.

24. The information processing method according to claim 13, further comprising selecting the first index in response to the search query.

25. A non-transitory computer-readable recording medium storing a program that enables a computer to execute an information processing method, the method comprising:
storing a plurality of indexes, the plurality of indexes comprising a first index and a plurality of second indexes corresponding to versions of the first index;
providing by a hardware processor, in response to a received search query, a first document from among the one or more documents based on the first index; and wherein:
the first index includes access control information and stores on a per-group basis a list of one or more documents accessible by each group of a plurality of groups of users.

26. The non-transitory computer-readable recording medium according to claim 25, wherein the method further comprises: generating, from the first index, access control cache data which stores an access right of each of the users for each of the one or more documents, and registering the access control cache data in a cache.

27. The non-transitory computer-readable recording medium according to claim 26, wherein the method further comprises providing the first document by searching the access control cache data.

28. The non-transitory computer-readable recording medium according to claim 26, wherein the search query includes time or trigger information as a search condition.

29. The non-transitory computer-readable recording medium according to claim 25, wherein the first index further stores:
on a per-group basis a list of one or more documents not accessible by each of a plurality of groups of users,
on a per-user basis for each of the users, a list of one or more documents accessible by each of the users, and
on a per-user basis for each of the users, a list of one or more documents not accessible by each of the users.

30. The non-transitory computer-readable recording medium according to claim 29, wherein providing the first document in response to the search query includes:
determining a user associated with the search query;
determining a first plurality of documents that satisfy the search query and are accessible by the user or a group of the user, and
determining a second plurality of documents that are not accessible by the user or a group of the user.

31. The non-transitory computer-readable recording medium according to claim 30, wherein the user is determined based on login information provided by the user.

32. The non-transitory computer-readable recording medium according to claim 25, wherein the method further includes selecting one of the plurality of second indexes in response to the search query.

33. The non-transitory computer-readable recording medium according to claim 25, wherein the second indexes are a time-series of index files.

34. The non-transitory computer-readable recording medium according to claim 25, wherein the method further comprises searching a latest index in response to the search query.

35. The non-transitory computer-readable recording medium according to claim 25, wherein the first document is present in the first plurality of documents and not present in the second plurality of documents.

36. The non-transitory computer-readable recording medium according to claim 25, wherein the method further comprises selecting the first index in response to the search query.

* * * * *